Aug. 8, 1950 — A. H. DICKINSON ET AL — 2,517,987
ELECTRICAL SYSTEM
Filed March 1, 1946 — 2 Sheets-Sheet 1
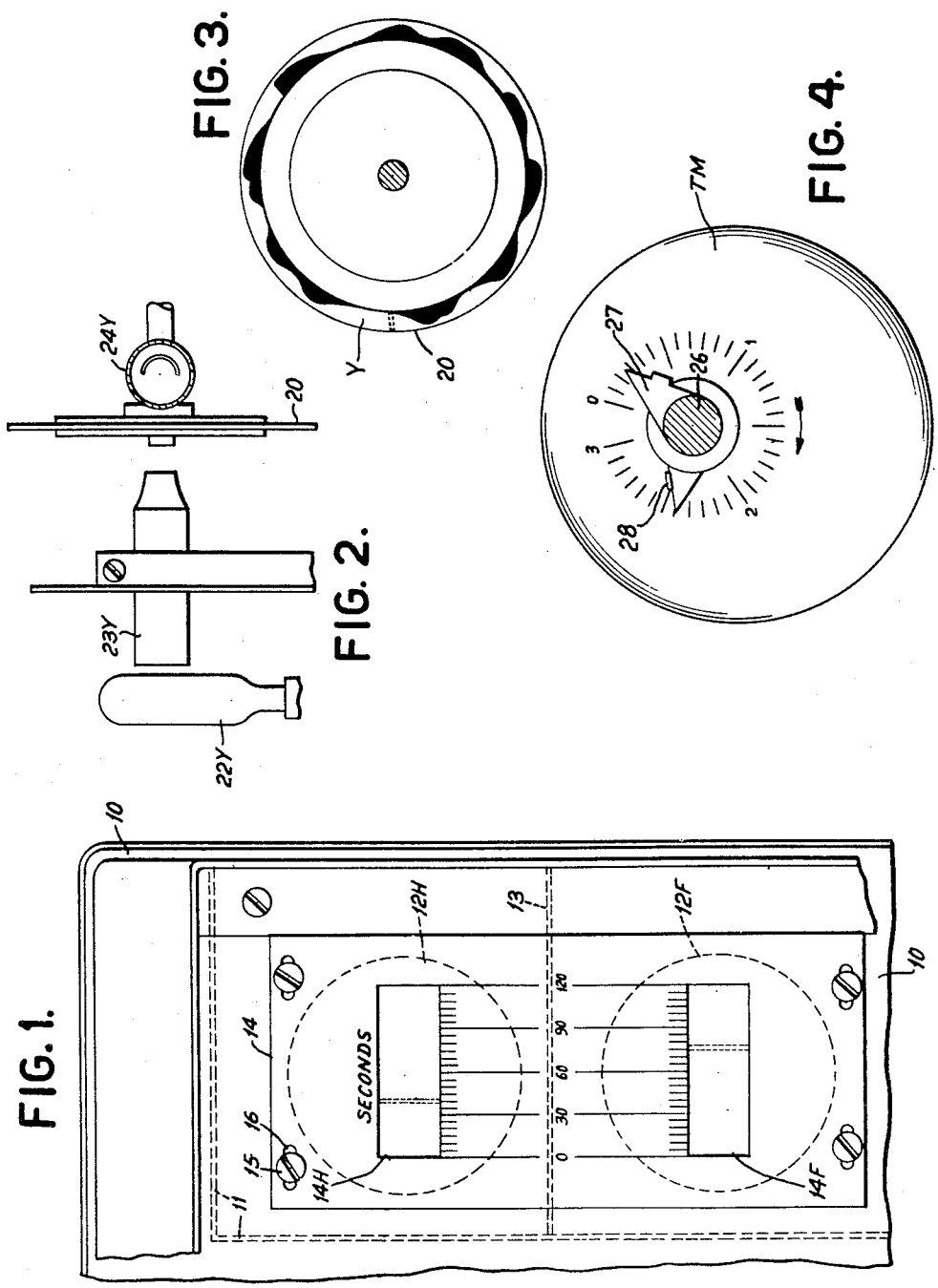
INVENTORS
A. H. DICKINSON
B. F. AMBROSIO
BY
ATTORNEY

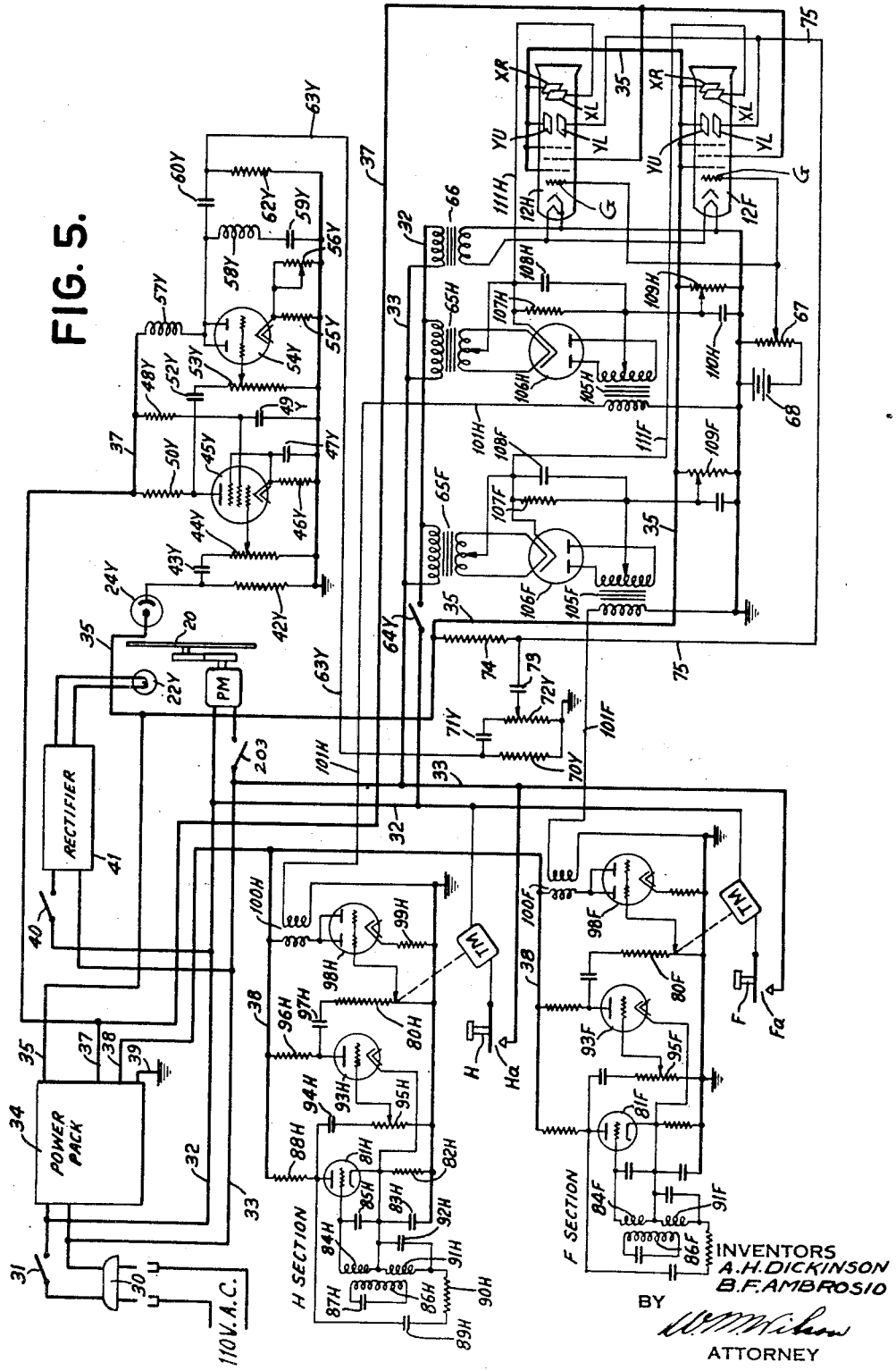

Patented Aug. 8, 1950

2,517,987

UNITED STATES PATENT OFFICE 2,517,987

ELECTRICAL SYSTEM

Arthur H. Dickinson, Greenwich, Conn., and Biagio F. Ambrosio, Long Island City, N. Y., assignors to International Business Machines Corporation, New York, N. Y., a corporation of New York Application March 1, 1946, Serial No. 651,268

3 Claims. (Cl. 161—15)

This invention relates to an electrical system for making measurements, such as elapsed time measurements or the like.

An object of the invention is to provide an electrical system in which a cathode ray tube is controlled to produce a traveling index trace.

An object of the invention is to control cathode ray means to indicate elapsed time.

An object of the invention is to control cathode ray means to measure elapsed time between two distinct operations.

An object of the invention is to modulate the amplitude of constant frequency oscillations in accordance with the variable phenomenon; time, for example, and to control remote electrical means by and according to such amplitude-modulated oscillations.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a front view, in full scale, of a portion of an indicator unit which includes cathode ray elapsed time indicating means.

Fig. 2 is a side view, on a reduced scale, of scanning means used to control the formation of index traces on the cathode ray tubes.

Fig. 3 is a face view of a scanned pattern disk, on the same scale as Fig. 2.

Fig. 4 is a front view, in full scale, of a timer unit which is used to produce time-regulated travel of the index traces on the cathode ray tube screens.

Fig. 5 is a circuit diagram.

It may be mentioned that while the invention is of general application to the measurement of progressive effects, it has been specifically applied to the measurement of elapsed time following each of two distinct operations in setting up a pair of values. In Fig. 5, keys H and F represent keyboards for setting up these values, and contacts Ha and Fa represent contacts closed under control of the keyboards.

Referring now to Fig. 1, the housing 10 of the indicator unit mounts an interior sub-frame 11. Two cathode ray tubes 12H and 12F are suitably mounted by the sub-frame and centered by means (not shown) attached to the front of the housing 10. A partition plate 13 shields the cathode ray tubes from each other. The screen ends of the tubes are exposed to view through sight openings 14H and 14F in an indicator plate 14. The plate 14 is attached to the front of housing 10 by screws 15 passing freely through elongated slots 16 in the plate. This allows the indicator plate to be laterally adjusted to register its zero graduation line with the zero positions of index traces formed on the tube screens. Embossed on the indicator plate are graduation lines which are split into upper and lower scales, respectively adjoining the upper and lower right openings. There are twenty-four graduations, each representing an increment of five seconds. Means are described later for producing travel of the index traces to the right (as viewed in Fig. 1) at the rate of one graduation every five seconds. Travel of the index trace of tube 12H starts when a so-called H operation is made. Similarly, travel of the index trace of tube 12F starts with the setting up of an F operation. Thus, the time elapsing from the start of the H operation is measured in seconds by the position of the trace of tube 12H and the elapsed time from the start of the F operation is given by the trace of tube 12F, with respect to the graduations. The elapsed time between the starting of the H operation and the starting of the F operation is measured by the number of graduations intervening between the index traces produced by tubes 12H and 12F. In the example illustrated in Fig. 1, the position of the trace produced by tube 12H indicates an elapsed time of 40 seconds from the start of an H operation, the position of the trace produced by tube 12F indicates that 75 seconds have elapsed since the start of an F operation. The number of graduations intervening between the two index traces is 7, representing an elapsed time of 35 seconds between the setting up of the H and F operations, and the observer can note that the F operation leads the H operation by 35 seconds.

The means for producing the index traces on the screens of tubes 12H and 12F include scanning means for a pattern disk 20 (Figs. 2 and 3). The scanning means includes exciter lamp 22Y and a condenser lens and diaphragm system inside tube 23Y for focusing a thin, concentrated beam of light radially across the annular track Y on the disk 20. The track has an irregular pattern of opaque portions, varying from maximum to minimum radial depth. The rest of the track is transparent, allowing light to pass to the photocell 24Y. A motor (shown only in the circuit diagram, Fig. 5) continuously rotates disk 20. During rotation of the disk, the track permits varying portions of the beam of light to pass to the photocell. The configuration of the opaque portion of the track is such that the amount of light passed to the photocell during each revolution of the pattern disk varies several times between two extremes. As will be brought out in the circuit description, the variation of light upon the photocell is utilized to vary the potentials across two deflection plates of each of the cathode ray tubes 12H and 12F in such manner that index traces are formed on the tube. It is understood that other suitable means than the scanning means and pattern disk provided herein may be used to control the potentials across the deflection plates for the purpose of forming index traces.

Fig. 4 shows the front of a conventional timer motor TM which is driven by 60 cycle A. C. voltage. This motor is used to introduce a time factor into the travel of the index traces on the cathode ray tube screens. On the face of the motor is a circular, time scale, each graduation representing five seconds. A shaft 26 driven by the motor carries a pointer 27 for sweeping the time scale. A stop 28 is adjusted about the shaft 26 to a desired position on the scale and then locked in this position. As shown, the stop 28 is adjusted to the position on the scale indicating two and a fraction minutes. The home position of the pointer 27 is at the 0 graduation line. When current is applied to the motor, it turns the shaft 26 and the pointer 27 through one graduation every five seconds. When the pointer strikes the stop 28, turning of shaft 26 is halted. As long as power remains on the motor, it holds the pointer 27 against the stop 28. When power is taken off the motor, an interior spring (not shown) restores the shaft 26 and pointer 27 to home position.

Referring now to the circuit diagram, Fig. 5, the apparatus receives power from a 60 cycle 110 v. A. C. source by connecting a plug 30 to the A. C. source outlet. Closure of a switch 31 applies the A. C. potential to lines 32 and 33. These lines connect to the input of a power pack 34 which produces different values of D. C. potential on its output lines 35, 37, and 38 with respect to the ground line 39. The closure of a switch 40 connects the lines 32 and 33 to the input of a rectifier unit 41 which includes a step-down transformer (not shown) and produces a reduced D. C. potential on its output. The output services the filament of the exciter lamp 22Y (also see Fig. 2), rendering it incandescent. Lines 32 and 33 are connected upon closure of a switch 203 to the motor PM which drives the pattern disk 20 (also see Figs. 2 and 3). With the exciter lamp 22 lit, the rotating pattern disk passes varying amounts of light, depending on the configuration of the opaque portion of track Y (see Fig. 3), to the photocell 24Y.

The photocell 24Y is connected between D. C. line 35 and a resistor 42Y which terminates at ground. Resistor 42Y is coupled by a condenser 43Y to a resistor 44Y. The resistor 44Y is tapped by the control grid of a pentode 45Y. This pentode has its cathode connected to ground by a resistor 46Y and a shunting capacitor 47Y. The suppressor of 45Y is connected to its cathode. The screen of 45Y is held at steady potential by connection to D. C. line 37 through a resistor 48Y and to ground through a condenser 49Y. A resistor 50Y connects the anode of 45Y to D. C. line 37. With the above arrangement, current flow in the pentode 45Y depends upon the control grid potential. As the disk 20 rotates and varies the light falling upon photocell 24Y, the current flow through resistor 42Y and the coupled resistor 44Y varies correspondingly. Accordingly, the potential of the control grid of pentode 45Y varies and produces amplified variations in current flow through the pentode. These variations are transferred by a capacitor 52Y to a resistor 53Y which is tapped by the grids of a twin triode 54Y. The common cathode of 45Y connects to ground via a resistor 55Y which is shunted by an adjustable resistor 56Y. The anodes of 54Y are connected to D. C. line 37 via an inductor 57Y. With the foregoing arrangement, current flow through 54Y and the load inductor 57Y varies according to the grid potential. The inductor 57Y is connected to ground via a resonant circuit comprising an inductor 58Y and capacitor 59Y and also is connected to ground via a circuit comprising capacitor 60Y and resistor 62Y.

Resistor 62Y serves as the input impedance of a transmission line 63Y, impressing thereon the output of double triode 54Y. It is seen that the variations in light falling upon photocell 24Y, as caused by track Y, produce variations in current flow through the photocell which are amplified by tubes 45Y and 54Y for distant transmission via line 63Y. Were not corrective provisions made, the varying potentials produced on resistor 62Y would be distorted during transmission by line 63Y. Both phase and frequency distortion would occur. Phase distortion is eliminated by leaving cathode resistors 55Y and 56Y of tube 54Y unshunted by capacitance. With this arrangement, tube 54Y has applied thereto a certain amount of inverse feedback, which is controlled by the adjustment of resistor 56Y. The provision of inductor 57Y in the load circuit of tube 54Y eliminates a large proportion of the frequency distortion. Since the reactance of inductor 57Y increases with an increase in frequency, the load resistance of tube 54Y correspondingly increases. Accordingly, high frequency variations in potential of the control grid are peaked in the output circuit of the tube to overcome transmission line losses. This peaking effect is augmented by the resonant circuit which comprises inductor 58Y and capacitor 59Y.

The current and voltage variations applied in the foregoing manner to line 63Y control the production of vertical index traces on the screens of the cathode ray tubes 12H and 12F. Each cathode ray tube includes an indirectly heated cathode, a control grid G and coordinate pairs of deflection plates XR—XL and YU—YL. When the grid is above cut-off potential, an electron beam is directed from the cathode to the screen. The vertical position of the beam on the screen is determined by the potentials across the deflection plates YU and YL and the horizontal position of the beam is determined by the potentials across the deflection plates XR and XL. By rapidly, continually varying the potential difference between plates YL and YU, the beam will be deflected up and down rapidly to produce a vertical index trace on the screen. The potential across plates XR and XL will be varied, in a manner described later, in accordance with elapsed time to cause the index trace to travel horizontally across the screen. To allow the cathode ray indicator tubes to function, a switch 64Y is preliminarily closed to connect the A. C. lines 32 and 33 to the primaries of transformers 65F, 65H, and 66. The secondary of transformer 66 supplies heater voltage to the cathode ray tubes 12H and 12F. The grids G of the tubes 12H and 12F are commonly connected to the arm of a potentiometer 67 which shunts biasing battery 68. By this means, the grid bias of the tubes 12H and 12F may be adjusted to control the brilliance of the index traces.

It was stated previously that the voltage variations which result from the scanning of disk 20 are transmitted to line 63Y to control the formation of the index traces on the tube screens. For this purpose, line 63Y is coupled by a resistor 70Y to ground. Resistor 70Y is shunted by a capacitor 71Y and potentiometer 72Y. The arm of potentiometer 72Y is coupled to D. C. line 35 by a capacitor 73 and resistor 74. The junction of the capacitor 73 and resistor 74 is connected to a wire 75 which has parallel connections to the deflection plates YL of tubes 12H and 12F. It may be noted that the transmission of the varying voltages brought about by the scanning means is effected by line 63Y near ground potential and that the capacitor 73 and resistor 74 provide direct current isolation means when translating voltage variations from a low potential reference to a high potential reference. Potentiometer 72Y determines the amplitude of the varying voltages transferred to plates YL of the cathode ray tubes. The companion plates YU connect to D. C. line 35. The foregoing arrangement produces potential differences across plates YL and YU of each tube which vary rapidly between two extremes. Accordingly, a virtually continuous vertical index trace is formed on the screen of each cathode ray tube.

The means for causing the index traces to travel horizontally across the screens of tubes 12H and 12F will now be explained. This means includes the two timer motors TM shown in Fig. 4 and previously described. One of the timer motors is associated with the H section of the apparatus and the other with the F section. Each section includes an oscillator circuit for producing a thousand-cycle-per-second wave which is amplitude-modulated under control of the associated timer motor. Both sections are alike, so that only one need be explained in detail. Similar elements of both sections are numbered alike but differentiated by letters H and F.

Considering the H section, the associated motor TM operates through shaft 26 (see Fig. 4) to drive the wiper arm of a fine wire, quality potentiometer 30H. With shaft 26 in zero position, the wiper arm uncovers no resistance and is at ground potential. When the motor is brought into operation, shaft 26 turns toward the stop 28 (Fig. 4) and drives the wiper arm to uncover an increasing, time-proportional extent of the resistance element of the potentiometer. The resistance element of potentiometer 30H is coupled to oscillator means which applies a thousand-cycle-per-second wave of fixed amplitude to the upper end of the resistance element. The oscillator means includes a tube 81H. The cathode return circuit of 81H includes a resistor 82H and a parallel capacitor 83H. A coupling circuit between the grid and cathode of 81H is comprised of an inductor 84H and a parallel capacitor 85H. The fundamental oscillator frequency is derived from the tank circuit comprising inductor 86H and capacitor 87H. This circuit is tuned to the fundamental frequency at which the oscillator is to operate, which in this instance is chosen as approximately one thousand cycles per second. The anode of tube 81H is connected to D. C. line 38 by a resistor 88H and is coupled to its cathode by a stabilizing circuit comprising capacitor 89H and resistor 90H in series with each other and with an inductor 91H and parallel capacitor 92H. It is seen that inductor 86H is the primary and inductors 84H and 91H are the secondaries of a transformer. The aforementioned stabilizing circuit intermediate the anode and cathode of tube 81H acts to maintain the oscillator at a substantially constant frequency irrespective of voltage variations between D. C. line 38 and ground.

The output of oscillator tube 81H is fed to a buffer tube 93H by a capacitor 94H and potentiometer 95H. The arm of 95H connects to the grid of 93H which has a cathode return circuit by way of the resistor 82H and which has an anode connection to line 38 by way of resistor 96H. It is clear that once potentiometer 95H is set, the load on the oscillator circuit is fixed. The output of 93H is a 1000 cycle-per-second wave of proper amplitude which is applied by a capacitor 97H to the resistance element of potentiometer 30H. The arm of 30H is connected to the grids of a double triode 98H. The cathode of 98H has a purely resistive connection 99H to ground. Since this resistor is not shunted by reactance, an inverse feedback effect is produced which stabilizes the operation of tube 98H. The anodes of 98H commonly connect to line 38 by way of the primary of a transformer 100H. The secondary of this transformer serves as the input impedance of a transmission line 101H.

As long as the timer motor TM stays in home or zero position, the arm of potentiometer 30H is at ground potential, as are the grids of tube 98H. Under this condition, no part of the 1000 cycle-per-second wave applied to 30H is transmitted to tube 98H and, hence, no change in potential occurs upon the transmission line 101H. But as soon as the Ha contacts are closed, signifying the start of an H operation, motor TM is connected to voltage lines 32 and 33 and set running. Its shaft 26 (Fig. 2) advances the arm of potentiometer 30H to uncover resistance increasing progressively in accordance with the time elapsing from the start of the H operation. Accordingly, a progressively increasing proportion of the amplitude of the 1000 cycle-per-second wave applied to 30H is transferred to the grids of double triode 98H. In response, the tube 98H and the load transformer 100H transfer an amplified, amplitude-modulated 1000 cycle-per-second wave to the transmission line 101H.

Similarly, the F oscillator functions to produce a 1000 cycle-per-second wave which is amplitude-modulated under control of the timer-operated arm of the potentiometer 30F after the start of an F operation. Tube 98F and its load transformer 100F transfer the amplified, modulated wave to the transmission line 101F.

The modulated waves applied to lines 101H and 101F respectively control the travel of the index traces produced on the screens of cathode ray tubes 12H and 12F. The means for converting the modulated waves on lines 101H and 101F to travel of the index traces are similar, so that a detailed explanation need be given of only one such means. Considering the H section, the line 101H is connected to the primary of a transformer 105H. This transformer is coupled through a full wave rectifier circuit to the deflection plate XL of tube 12H. The rectifier circuit includes double diode 106H. This receives heater potential from the secondary of transformer 65H. The anodes of 106H are connected to opposite ends of the secondary of 105H. The cathode of 106H is connected to the center tap of the secondary of transformer 65H and also connected via a load resistor 107H, shunted by a capacitor 108H, to the center tap of the secondary of the transformer 105H. The center tap of 105H also connects to the arm of a potentiometer 109H which extends between D. C. line 35 and ground. A capacitor 110H connects the arm of 109H to ground. The rectified direct current potential is transmitted by a wire 111H to the deflection plate XL of tube 12H. The companion deflection plate XR is connected to D. C. line 35.

As stated before, when the timer motor of the H section is at home position, there is no change in potential on the transmission line 101H. Accordingly, the transformer 105H does not develop a voltage and there is no voltage generated across the double diode 106H and no change in potential across the resistor 107H. Under this condition, the potential of deflection plate XL of tube 12H is determined solely by the setting of potentiometer 109H. It may be mentioned that the potentiometer 109H is preliminarily adjusted to provide for a potential difference across plates XL and XR such as to maintain the index trace at the zero graduation line (Fig. 1). Thus, at zero elapsed time of operation H, the index trace produced by tube 12H is in zero indicating position.

As previously explained, when timer motor TM of the H section is placed in operation at the start of an H operation, a 1000 cycle-per-second wave of continuously increasing amplitude is produced and is applied to line 101H. Transformer 105H applies this wave form to double diode 106H whose rectifying action produces a direct current voltage of progressively increasing amplitude across its load resistor 107H. This direct current voltage is applied to the plate XL of tube 12H and opposes to a progressively increasing extent the initial potential of the plate XL. According, the index trace of tube 12H travels to the right (Fig. 1) at a uniform rate in correspondence with the passage of time from the start of the H operation. The position of the trace with respect to the graduations on indicator plate 14 (Fig. 1) measures the elapsed time. Therefore, it is necessary to move the index trace to the right not merely in proportion to time but through such time-proportional incremental distances as are consonant with the calibration of the time scale on plate 14. Specifically, the index trace must move to the right from each graduation to the next in five seconds, or at a rate such as to sweep across the entire scale in 120 seconds. While the timer motor advances the arm of potentiometer 80H across equal incremental proportions of the resistance element of 80H in given time increments, it does not follow that the increase in potential upon the potentiometer arm as it advances across an incremental proportion of the resistance element has a fixed value. The value of such increase in potential depends on the magnitude of the potential applied by the tube 93H to the resistance element of 80H. In other words, the greater the amplitude of the 1000 cycle-per-second wave applied by tube 93H to the resistance element, the greater will be the incremental increase in potential upon the potentiometer arm as it sweeps an incremental proportion of the resistance element. A correspondingly greater increase in potential upon the plate XL of tube 12H and a resulting greater distance of travel of its index trace will occur in a fixed movement of time. Thus, if the amplitude of the 1000 cycle-per-second wave applied by tube 93H to the potentiometer 80H be too great, the index trace will traverse the time scale on plate 14 in less than 120 seconds, but if the applied amplitude be too small, the index trace will traverse only a fraction of the scale in 120 seconds. It is necessary, then, that the applied amplitude be such that the index trace will traverse the entire time scale in exactly 120 seconds. The proper applied amplitude is obtained by correct adjustment of the arm of the potentiometer 95H. Such adjustment provides for the proper proportion of the output of oscillator tube 81H to be impressed upon the grid of tube 93H. In turn, tube 93H will develop the proper amplitude of the 1000 cycle-per-second wave which when transmitted to the resistance element of 80H will control, through the intervening means, travel of the index trace of 12H at the rate demanded by the calibration of the scale on plate 14.

In the same manner as explained for the H section, the F section when placed in operation produces amplitude-modulated oscillations which are transmitted by line 101F to transformer 105F. These oscillations are rectified by double diode 106F and the output applied to the plate XL of tube 12F. Adjustment of the potentiometer 95F provides for the correct rate of travel of the index trace of tube 12F to the right with respect to the scale on plate 14. It may be noted that tube 106F receives filament voltage from transformer 65F and that elements 84F, 81F, 93F, 95F, 80F, 98F, 100F, 107F, 108F and 109F have the same functions as the correspondingly numbered elements relating to the H oscillator and rectifier sections.

The index trace on tube 12H or tube 12F may be restored to zero position before or after two minutes have elapsed by reopening contacts Ha or Fa, respectively. Upon the reopening of contacts Ha, for instance, the timer motor of the H section returns immediately to home position, as does the arm of potentiometer 80H. Thereupon, the arm of 80H and the grids of tube 98H again are at ground potential and this tube develops no voltage upon the transformer 100H. Accordingly, there is no voltage upon line 101H and tube 106H does not apply any potential to plate XL of tube 12H. Thereupon the trace of tube 12H returns to its zero position.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electrical measuring system comprising a cathode ray tube including a cathode ray source, a screen, and coordinate pairs of deflection elements to direct the ray to desired positions on the screen, a circuit including a grid controlled amplifier tube having only a resistance element in its cathode circuit, an inductive plate load and a resonant circuit energized therefrom for producing a potential across one pair of the deflection elements such as to cause the ray to produce an index trace, a circuit to produce oscillations of a given characteristic, potentiometer for effecting utilization of a predetermined amplitude of the oscillations to cause the trace to traverse the screen at a uniform rate, means to modulate these oscillations, and a circuit for rectifying the modulated oscillations and applying corresponding direct current modulated potential across the other pair of deflection elements.

2. A system for measuring elapsed time including a pair of cathode ray tubes each having an electron source, a screen and a pair of horizontal and vertical electron deflection plates; similar indicating scales correspondingly placed over said screens; a scanning system including a rotatable disc having irregular opaque portions, an exciter lamp, means for concentrating a beam of light on said disc and a photocell responsive to light penetrating said disc; connections for conveying a varying potential from the photocell to a grid controlled amplifier; only resistance in the cathode circuit of the last tube of said amplifier for reducing phase distortion in the output of said amplifier; an inductive plate load connected to the last tube of said amplifier; a resonant circuit energized from said inductive load; said inductive load and resonant circuit serving to reduce frequency distortion and an impedance matching resistance connected intermediate said amplifier and a transmission line for controlling a vertical index trace on each cathode ray tube.

3. The system set forth in claim 2 including a timer motor and timer control for each cathode ray tube for determining the duration of a horizontal index trace on the screen of each tube; a pair of oscillators; a potentiometer for each oscillator controlled by the respective timer motors for amplitude modulating the output of the oscillators; a rectifier for rectifying the amplitude modulated output of each oscillator and a connection therefrom to one horizontal deflection plate of each cathode ray tube; a connection from each of the other horizontal plates to a direct current source whereby the rotation of a timer motor causes a voltage wave of continuously increasing amplitude to be applied to one horizontal deflection plate of the corresponding cathode ray tube.

ARTHUR H. DICKINSON.
BIAGIO F. AMBROSIO.

REFERENCES CITED

The following references are of record in the file of this patent:

UNITED STATES PATENTS

| Number | Name | Date |
|---|---|---|
| 1,882,684 | Achard | Oct. 18, 1932 |
| 1,966,696 | Vincent | July 17, 1934 |
| 2,088,478 | Kovalsky | July 27, 1937 |
| 2,283,103 | Stuart | May 12, 1942 |
| 2,301,197 | Bradford | Nov. 10, 1942 |
| 2,394,196 | Morgan | Feb. 5, 1946 |
| 2,397,032 | Mestas | Mar. 19, 1946 |
| 2,406,858 | Shepherd | Sept. 3, 1946 |
| 2,418,364 | Moe | Apr. 1, 1947 |
| 2,419,550 | Hardy | Apr. 29, 1947 |